United States Patent [19]
Taniguchi

[11] Patent Number: 5,894,780
[45] Date of Patent: Apr. 20, 1999

[54] COMPOSTING CONTAINER

[75] Inventor: Mitsunori Taniguchi, Osaka, Japan

[73] Assignee: Tanaka Sangyo Co., Ltd., Osaka, Japan

[21] Appl. No.: 08/925,888

[22] Filed: Sep. 8, 1997

[51] Int. Cl.⁶ .............. C05F 11/08; B65D 30/00; C12M 3/00
[52] U.S. Cl. .............. 71/9; 71/11; 435/290.1; 435/290.4; 383/2; 383/41; 383/67; 383/97; 383/117; 383/903
[58] Field of Search .............. 435/290.1, 290.4; 383/2, 41, 67, 97, 117, 903; 71/9, 11

[56] References Cited

FOREIGN PATENT DOCUMENTS

| 434520 | 6/1991 | European Pat. Off. | ........ C05F 17/02 |
|---|---|---|---|
| 3019253 | 11/1981 | Germany | ........ C05F 9/02 |
| 3418735 | 11/1985 | Germany | ........ C05F 09/02 |
| 61-10093 | 1/1986 | Japan | ........ C05F 17/02 |
| 3013789 | 7/1995 | Japan | ........ C05F 3/00 |

*Primary Examiner*—David A. Redding
*Attorney, Agent, or Firm*—Thompson Hine & Flory LLP

[57] ABSTRACT

A composting container for holding and composting farming and stock raising waste material including a barrel, and top and bottom lids openable. The circumference of a lower half portion of the said barrel of the container is tightened by bands. This arrangement helps the container efficiently ferment and decompose a manure inside without tedious works such as providing proper moisture and ventilation, which are regularly required in conventional manure storage outdoors.

15 Claims, 3 Drawing Sheets

COMPOSTING CONTAINER

BACKGROUND OF THE INVENTION

1. Field of the Invention

The present invention relates to the structure of a composting container in which a good compost is produced from farming and stock raising waste material such as chaff or straw, as a starting material, which has served as a litter for livestock and which is mixed with or soaked in a great deal of manure.

2. Description of the Related Art

A need for composting farming waste material such as chaff and straw and reusing it is strongly voiced. Chaff is traditionally used as a litter for livestock, and used litter is piled up outdoors for decomposition and fermentation. To promote composting of the farming and stock raising waste material, the moisture rate of the pile should be constantly kept within a range of 40 to 80%, and ventilation should be provided to assure the activity of aerobic bacteria. For this reason, ones should attend to the pile frequently to water and stir up the pile as required and to arrange ventilation tube for providing ventilation.

With a view to resolving the above problem, the inventor of this invention disclosed "a method of promoting the composting of a high moisture content manure" in Japanese Patent Open Gazette No. 61-10093 (laid open on Jan. 17, 1986). In this disclosure, the inventor proposes the use of a large container comprising a barrel sewn of a permeable material with openably attached top and bottom lids to compost efficiently farming and stock raising waste material having a high moisture content.

This type of container typically used outdoors usually employs a top lid manufactured of non-permeable material to assure a good moisture content and thus to expedite decomposition of the manure inside. The container is sewn in a manner to be tapered wide toward the bottom side so that the clumping of the manure is prevented when it is taken out after decomposition of the manure is complete. The structure of such a container was also laid open in Japanese Utility Model Registered No. 3013789 (published on Jul. 18, 1995).

The bottom lid of this conventional composting container is designed to be entirely openable at the bottom end, and even a barrel tapered wide toward the bottom end takes about two months before the manure inside is fully decomposed. Meanwhile, the manure sinks from above, swelling at the middle height, and is compactly pressed and hardened. When the bottom lid is opened, the clumped state is not released, and taking out the manure is difficult.

SUMMARY OF THE INVENTION

In an effort to resolve the above problem, the inventor has successfully resolved the above problem by tightening or shrinking the circumference of the barrel of the composting container on its lower half portion to some degree based on the understanding that the mid-portion swelling of the barrel is attributed to the unavoidable cloth extension of the permeable material. More particularly, used as means for tightening the circumference of the barrel are two to four narrow bands or one to two wide bands.

According to the composting container thus constructed of the present invention, even when the manure sinks and is pressed and hardened in the lower half of the container during a long decomposition period, the use of the bands for tightening the barrel prevents reliably the mid-portion or lower-portion swelling. When delivering the decomposed manure, the tightening by the bands are released, and the bottom lid is opened. The entire quantity of manure is quickly drained.

DESCRIPTION OF THE PREFERRED EMBODIMENTS

Figure 1:
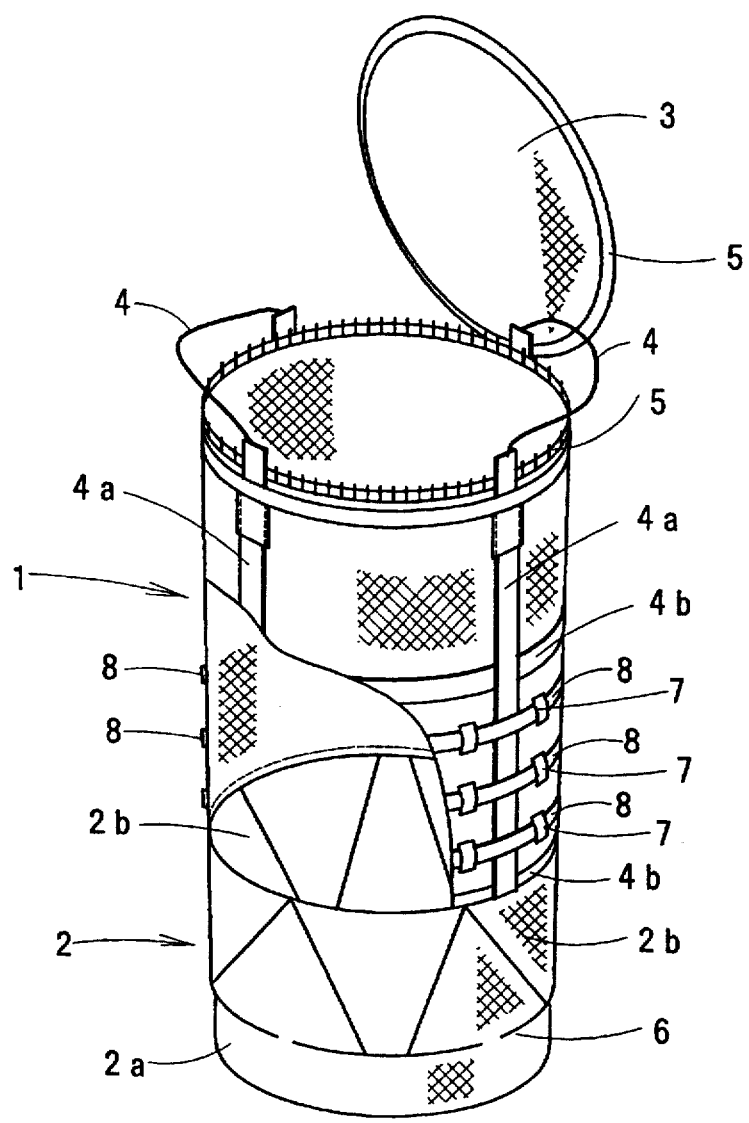
FIG. 1 is a partially cutaway, perspective view of the container of the present invention.

Referring now to the drawings, one embodiment of the present invention is discussed. A barrel 1 is made of fabric which is manufactured by knitting net fabric with polyester synthetic fiber and then by coated it with vinyl chloride resin, or made of fabric into which synthetic resin monofilament is knitted. Any of these material provides a relatively good ventilation with its typical void ratio being as good as 30%. A bottom lid 2 having the same void ratio as the barrel 1 and contains a fold portion 2a, extended from the barrel 1, for closing the barrel and a petal-like bottom member 2b that serves at the bottom in a closed state and are fully unfolded in an open state. A top lid 3 is openably attached to the top edge of the barrel, and is manufactured of a synthetic resin sheet of water-repellant characteristics.

Shown in FIG. 1 are handles 4 provided at the top of the container barrel 1, vertically extending barrel reinforcement belts 4a, barrel reinforcement belts 4b horizontally extending around the barrel, a zipper 5, attached to the top edge of the barrel, closing and opening the top lid, and a rope 6 sewn through the petal-like bottom member 2b.

Vertically extending two to four circular bands 7 are sewn to the circumference of the barrel on the lower half portion of the barrel 1 and are spaced apart by 100 to 250 mm, preferably 150 mm vertically along the barrel, and ropes or other stretchless narrow bands 8 are passed horizontally through the circular bands 7. Before or immediately after introducing the manure into the container, the narrow bands 8 are tightened to shrink the lower portion of the barrel. A number of darts are produced in the fabric of the barrel. In this case, the shrink ratio is increased in the lower portion of the barrel or the spacing between the narrow bands 8 are narrowed as the barrel extends downward so that the manure inside is piled in a generally tapered form to the bottom. With this arrangement, the manure is easily drained.

Figure 2:
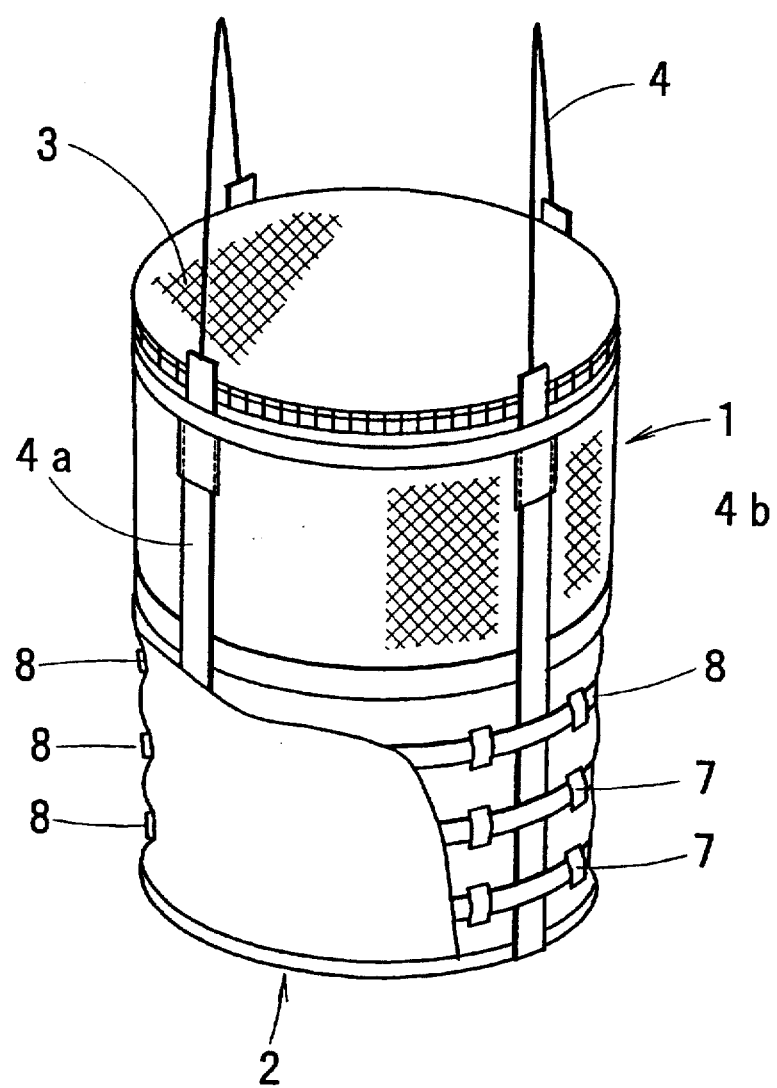
FIG. 2 is a partially cutaway, perspective view of the container with its manure inside decomposed.
Figure 3:
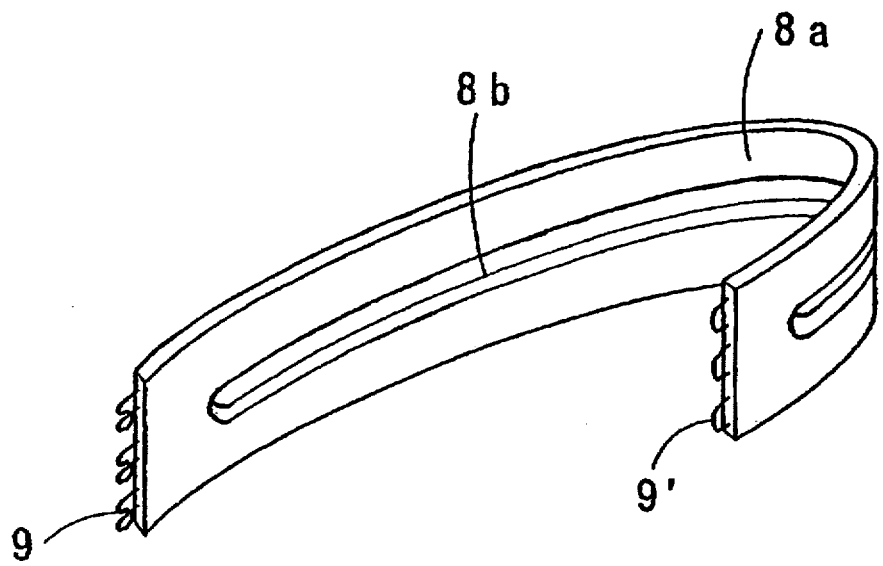
FIG. 3 is a perspective view of wide bands.

FIG. 2 shows another embodiment of the container barrel. Wide bands 8a are used as tightening means for the barrel. Circular bands 7 of a proper number have appropriate width so that the wide bands 8a are attached to the lower portion of the barrel. The use of the circular bands 7 is preferable but not a requirement of the present invention. The number of wide bands 8a is determined depending on their width, but typically one to two. The length of the wide bands 8a is determined depending on a desired shrink ratio, and each of the wide bands 8a is provided with male and female hooks 9, 9' (as shown in FIG. 3).

Both narrow bands 8 and wide bands 8a have to be stretchless. In any of the bands, if the spacing between the bands is too wide, the swelling of the fabric is large, and if the spacing between the bands is too narrow, ventilation effect drops and a good manure cannot be obtained. A proper setting of the spacing is required. It is important to make sure that the wide bands 8a should not reduce the ventilation effect greatly. When their width is too wide, continuous or continual holes 8b are preferably formed along the center line of the wide band 8a.

To use the container actually, the container is set up with the bottom lid 2 closed and the bands 8 or 8a tightened to an appropriate level, chaff and straw used as a litter for livestock are introduced into the container through its opening, and the container is closed. The container is transferred to its proper storage location and put there with its bottom slightly spaced apart from the ground.

When the manure has extra water with its moisture content above 80%, for example, it is squeezed out through ventilation pores in the barrel 1 and bottom lid 2. An upward air flow is generated from the bottom portion having a relative good permeability to the barrel 1, and acts to adjust the moisture content of the manure further. Since the top lid 3 is manufactured of the water-repellent material, rainwater is prevented from flowing in. Since sunlight is screened, the manure inside the container is protected from over-moisture conditions or dry conditions, and the moisture content is kept within a range from 40 to 80%. This level of moisture along with a proper rate of air flow through the container helps cultivate aerobic bacteria, promoting decomposition and fermentation of the manure.

Even if the manure inside sinks, is pressed down and hardened during composition period in the container properly tightened by the bands 8 and 8a on the lower portion of the barrel, the manure is quickly drained without any clump in the mid-portion of the barrel simply by releasing the bands to open the bottom lid 2.

As described above, according to the present invention, the manure sinks and thickened in the lower half portion of the container during a long decomposition period and the shrinking effect of the bands reliably prevents mid-portion or bottom portion swelling of the manure. By simply releasing the bands and opening the bottom lid, the entire amount of manure fully decomposed is quickly drained.

The composting container of the present invention may be used to store or transport chaff, straw or grass other than manure. The composting container of the present invention is particularly useful in composting used litter for livestock having a high moisture content, because it efficiently ferments and decomposes the manure without tedious works such as providing proper moisture and ventilation, which are required in conventional storage outdoors.

What is claimed is:

1. A composting container for holding and composting farming and stock raising waste material comprising:

a barrel having an upper portion and a lower portion, top and bottom openable lids, and at least one releasable band encircling said lower portion of said barrel for reducing a diameter of said barrel.

2. The composting container of claim 1 further comprising between two and four relatively narrow releasable bands positioned such that ventilation through the composting barrel is not unduly limited.

3. The composting container of claim 1 wherein the length of said releasable band is less than a circumference of said lower portion of said barrel, such that when said band is releasably attached around said lower portion of said barrel, said barrel diameter is decreased.

4. The composting container of claim 1 further comprising a plurality of bands encircling said lower portion of said barrel.

5. The composting container of claim 1 further comprising between one and three relatively wide releasable bands positioned such that ventilation through the composting barrel is not unduly limited.

6. A composting container according to claim 1, wherein the said barrel of the container is manufactured of a ventilated material.

7. A composting container according to claim 6, wherein the said ventilated material is fabric which is manufactured by knitting net fabric with polyester synthetic fiber and then by coating the said net fabric with vinyl chloride resin.

8. A composting container according to claim 6, wherein the said ventilated material is fabric into which synthetic resin mono-filament is knitted.

9. A composting container according to claim 8, wherein the said top lid and the bottom lid are openably attached to the said barrel using a zipper.

10. A method for holding and composting farming and stock raising waste material comprising:

selecting a composting container including a barrel having an upper portion and a lower portion, top and bottom openable lids, and selecting at least one releasable band;

reducing a diameter of said lower portion of said barrel by attaching said releasable band around said lower portion of said barrel;

opening said top lid and loading farming and stock raising waste material into said container;

allowing said waste material to decompose for a sufficient period of time;

opening said bottom lid and releasing said band, thereby allowing said diameter to increase, facilitating easy removal of said decomposed waste material.

11. The method of claim 10 wherein said selecting step includes the step of selecting two to four relatively narrow releasable bands, and wherein said diameter reducing step includes the step of attaching said two to four relatively narrow bands around said lower portion of said barrel.

12. The method of claim 10 wherein said selecting step includes the step of selecting one to three relatively wide releasable bands, and wherein said diameter reducing step includes the step of attaching said one to three relatively wide bands around said lower portion of said barrel.

13. The method of claim 11 wherein said diameter reducing step includes the step of positioning said bands so that ventilation to the barrel is not unduly obstructed.

14. The method of claim 12 wherein said diameter reducing step includes the step of positioning said bands so that ventilation to the barrel is not unduly obstructed.

15. The method of claim 10 wherein said selecting step further includes the step of selecting a plurality of releasable bands.

* * * * *